United States Patent [19]
Simpson

[11] Patent Number: 6,029,589
[45] Date of Patent: Feb. 29, 2000

[54] PORTABLE STEAM WEED KILLING APPARATUS

[76] Inventor: Stephen Simpson, 20210 72nd St. E., Bonney Lake, Wash. 98390

[21] Appl. No.: 09/206,776

[22] Filed: Dec. 7, 1998

[51] Int. Cl.[7] ............................ A01M 19/00; A01C 23/00
[52] U.S. Cl. ............................... 111/7.2; 111/127; 43/130; 239/136; 239/139; 239/154; 239/754
[58] Field of Search ............................... 111/7.2, 118, 127; 239/136, 135, 139, 754, 154, 152; 43/130

[56] References Cited

U.S. PATENT DOCUMENTS

| | | | |
|---|---|---|---|
| 1,021,529 | 3/1912 | Johnson | 111/127 X |
| 1,021,530 | 3/1912 | Johnson | 111/127 X |
| 4,964,472 | 10/1990 | Cleworth | 111/7.2 X |
| 5,031,355 | 7/1991 | Ryan | 43/130 |
| 5,259,327 | 11/1993 | Thompson, Jr. et al. | 111/118 |
| 5,385,106 | 1/1995 | Langshaw | 111/127 |
| 5,430,970 | 7/1995 | Thompson et al. | 47/1.5 |
| 5,433,758 | 7/1995 | Thompson et al. | 47/58 |
| 5,575,111 | 11/1996 | Rajamannan | 47/58 |
| 5,622,123 | 4/1997 | Rajamannan | 111/120 |

FOREIGN PATENT DOCUMENTS

| | | | |
|---|---|---|---|
| 2383601 | 10/1978 | France | 111/118 |
| 2402405 | 5/1979 | France | 111/118 |
| 2402406 | 5/1979 | France | 111/118 |
| 2464647 | 4/1981 | France | 111/118 |
| 221054 | 4/1985 | Germany | 111/118 |
| 593684 | 2/1978 | U.S.S.R. | 111/118 |
| 852249 | 8/1981 | U.S.S.R. | 111/118 |

*Primary Examiner*—Christopher J. Novosad
*Attorney, Agent, or Firm*—Dean A. Craine

[57] ABSTRACT

A portable, steam weed killing apparatus designed to be environmentally friendly, economical, fast acting and used by an individual standing in an upright position. The apparatus is intended for killing weeds and unwanted plants in gardens, flower beds and along sidewalks by application of concentrated heated water or steam thereto. The apparatus includes electrically powered, portable steam generating unit containing a water reservoir, an electric pump and an electric steam heater. The apparatus also includes an elongated, rigid guide bar with a weed cover attached to its distal end. A flexible hose delivers steam from the steam generating unit to the weed cover. During use, the weed cover is placed over the undesired plant and the steam generating unit is operated to deliver a concentrated amount of steam to the plant located inside the weed cover. In another embodiment of the invention, the steam generating unit includes a super-heating steam unit which provides saturated, super-heated steam for greater killing effect.

5 Claims, 5 Drawing Sheets

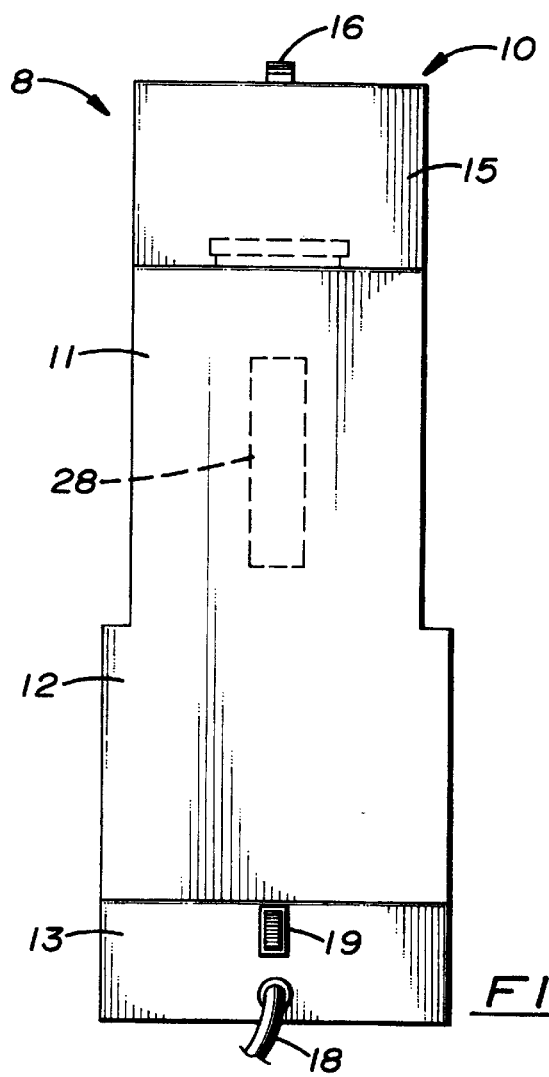
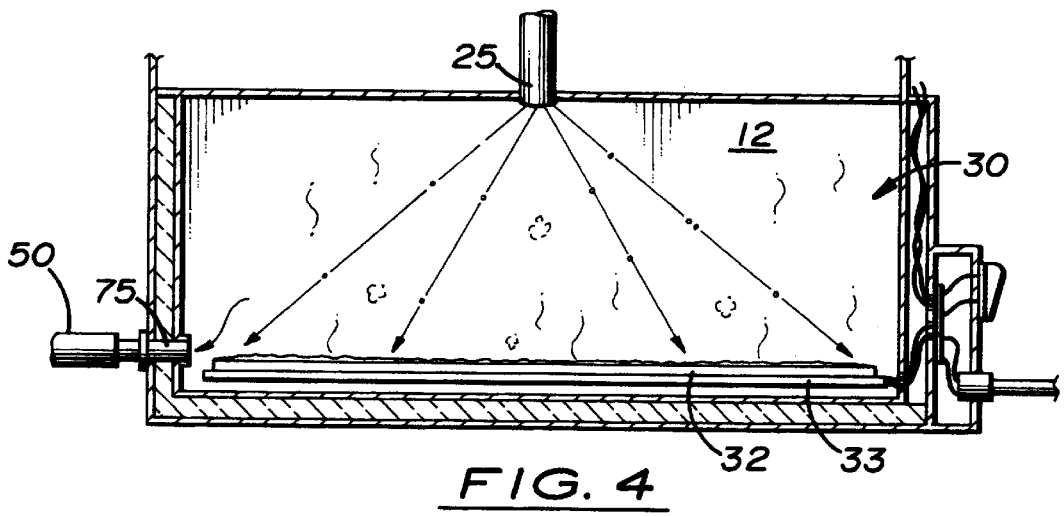

PORTABLE STEAM WEED KILLING APPARATUS

BACKGROUND OF THE INVENTION

1. Field of the Invention

The present invention relates to an apparatus for controlling weeds and undergrowth in and around shrubs, flower beds, gardens, driveways and sidewalks and, more particularly, to such an apparatus that uses hot water or steam.

2. Description of the Related Art

Weeds and other unwanted plants often grow around shrubs and in other areas such as flower beds, gardens and in and around sidewalks and driveways where such plants or weeds detract from the overall visual affect. There are several methods of controlling the growth of these weeds or unwanted plants, many use herbicides which are spread into the soil and affect plants which are intended to be growing in the area. Many of these herbicides are also harmful to humans and other animals. Also, they tend to be slow acting and take two to five days to kill the weed or plant. Another method of eliminating this unwanted vegetation includes bending close to the ground and pulling the plants or weeds by hand. This can cause strained muscles. If the root is not killed, the weed or other unwanted plant has an opportunity to regrow necessitating another treatment.

Apparatus that apply steam or hot foam to kill vegetation is known in the prior art, (see U.S. Pat. Nos. 5,430,970 and 5,385,106). One problem with such apparatus is that they can not be used to selectively kill plants in a confined area, such as a flower bed or garden. Also, the temperature of the steam or foam used by such apparatus may be insufficient and no means is provided for concentrating the steam or foam around the plants known to be resistant to heat or steam.

What is needed is a compact apparatus that is environmentally friendly, economical and quick acting that will not cause the user to encounter strained muscles, toxic fumes or substances or re-growth of the unwanted weeds or plants. Such an apparatus must be capable of spot killing so it is usable with flower beds or near other decorative foliage and be selectively adjustable for killing plants having different resistance to steam.

SUMMARY OF THE INVENTION

It is an object of the present invention to provide a weed killing apparatus with which an individual can easily and effectively kill weeds in areas around shrubs, flower beds, gardens, and between cracks in sidewalks and driveways.

It is another object of the present invention to provide such a weed killing apparatus that does not use herbicides which could be hazardous to humans or other nearby plants, and expensive.

It is a further object of the present invention to provide such a weed killing apparatus which is quick acting, lightweight and can be operated by a person standing in an upright position.

These and other objects are met by a portable, electrically powered, steam-generating weed killing apparatus. The apparatus includes a steam generating unit that contains a water reservoir tank and a steam generating means. The apparatus also includes an elongated, rigid guide bar with a concentrating enclosure attached at its distal end designed to be placed around an unwanted plant. A delivery tube is disposed between the steam generating unit and the concentrating enclosure to deliver normal or super-heated steam produced inside the steam generating unit to the enclosure. The apparatus is then operated to selectively destroy unwanted plants having different heat resistance in and around flower beds, sidewalks and patios.

BRIEF DESCRIPTION OF THE DRAWINGS

FIG. 3 is a sectional, front elevational view of the steam generating unit shown in FIG. 2.

FIG. 4 is a partial, sectional side elevational view of a second embodiment of the steam generating unit.

DESCRIPTION OF THE PREFERRED EMBODIMENT(S)

Figure 1:
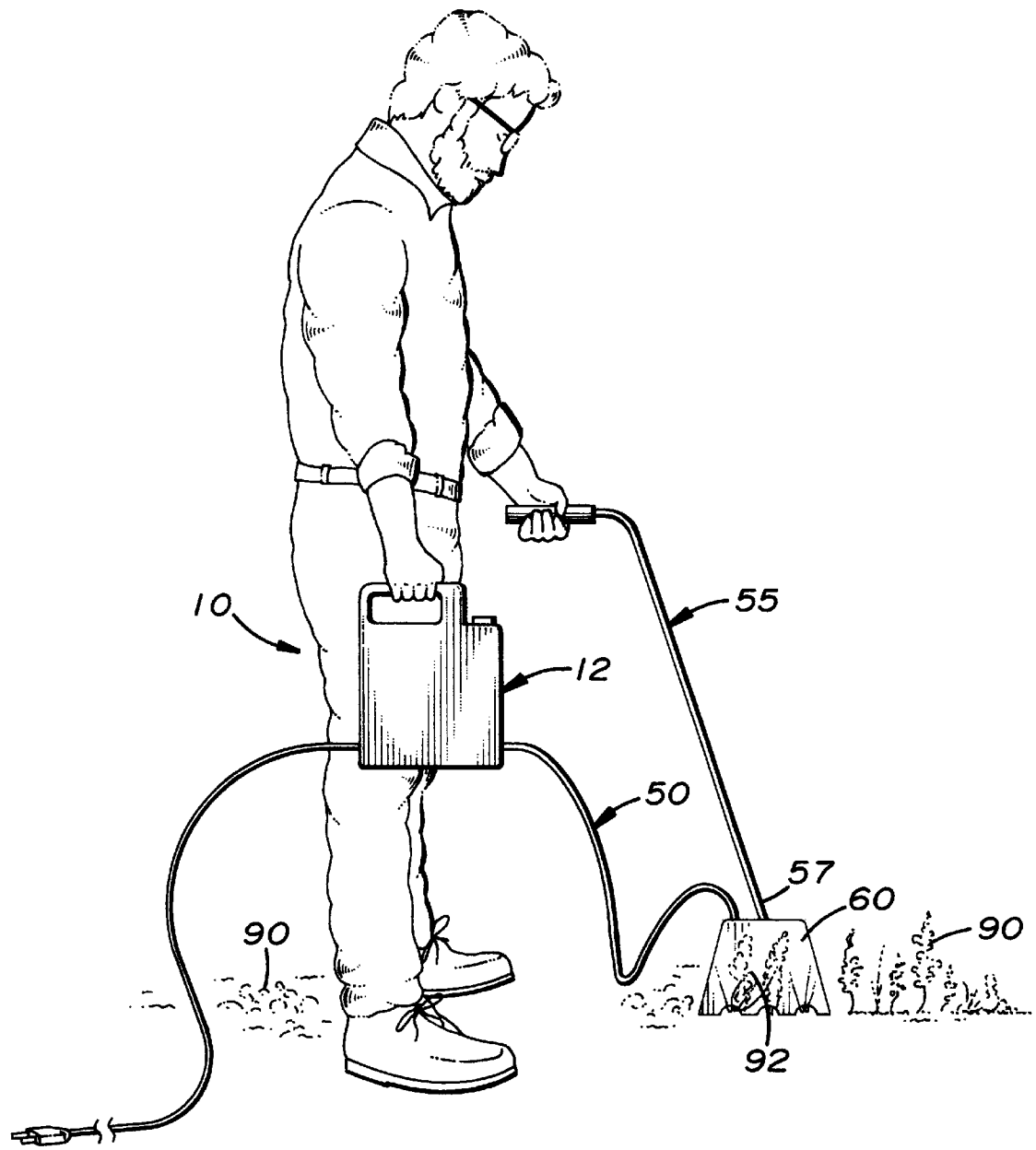
FIG. 1 is an illustration showing an individual using the apparatus disclosed herein to kill unwanted vegetation.
Figure 2:
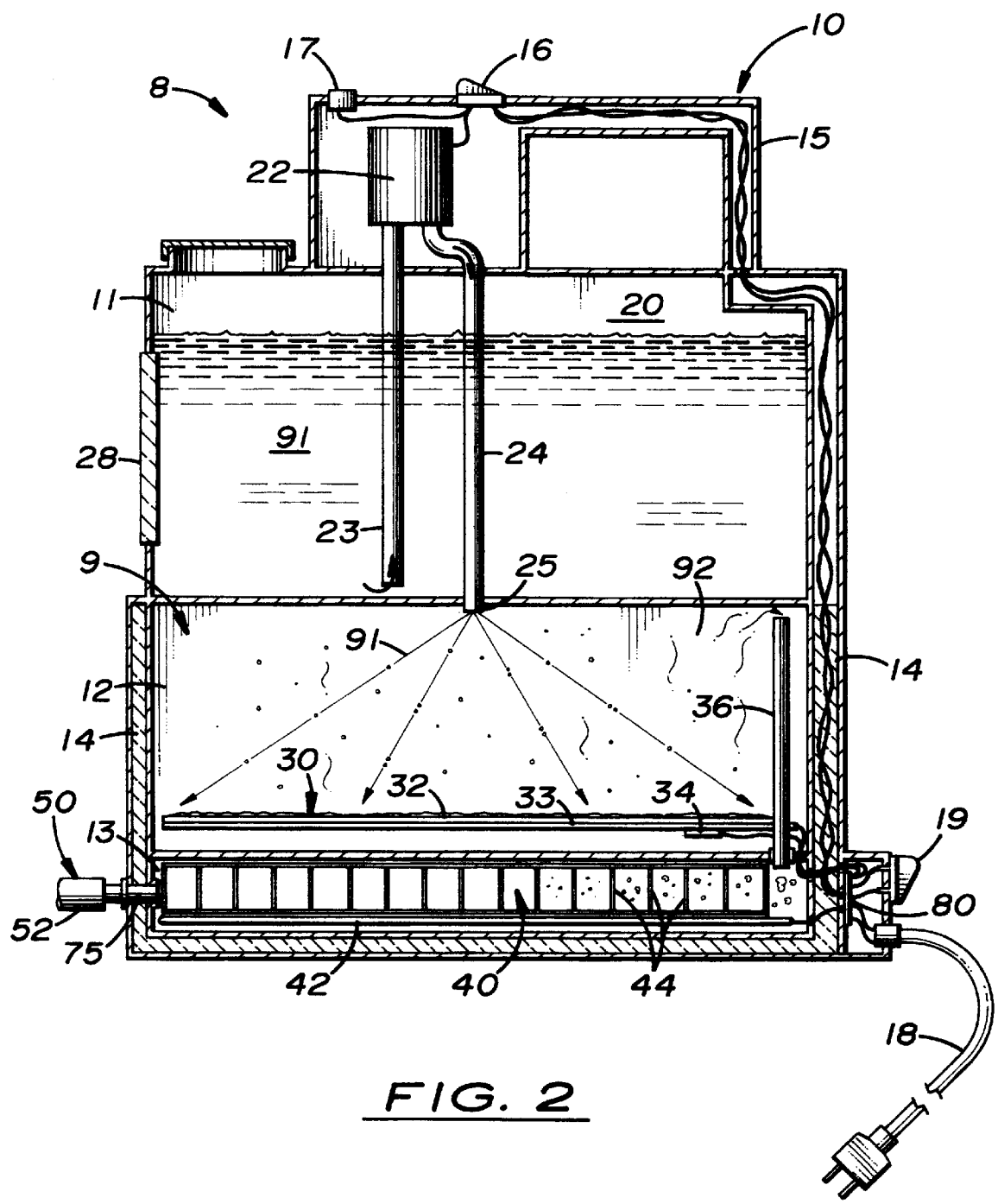
FIG. 2 is a sectional, side elevational view of the steam generating unit.
Figure 5:
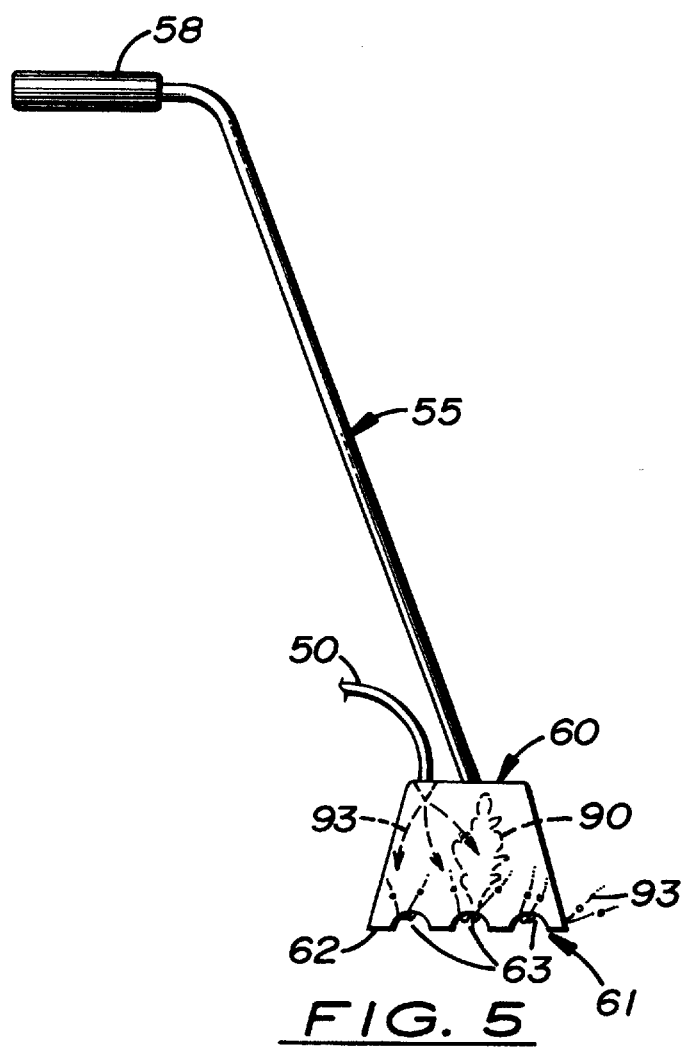
FIG. 5 is a side elevational view of the bar assembly.
Figure 6:
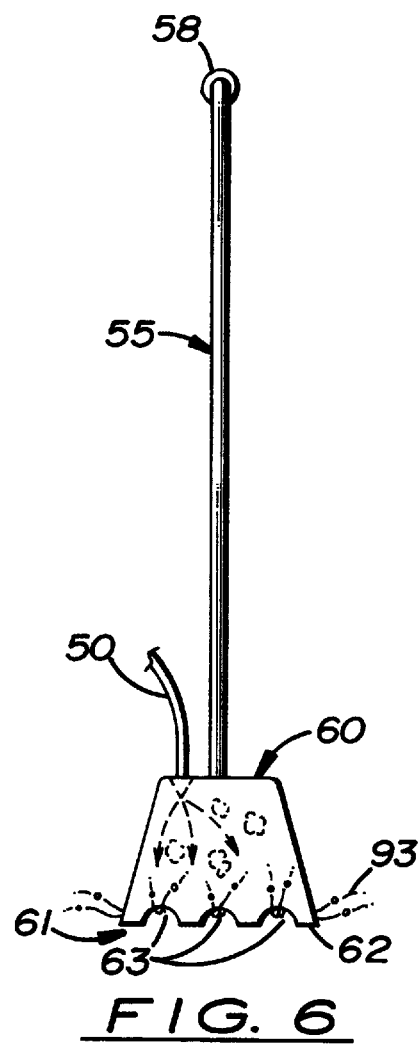
FIG. 6 is a front elevational view of the bar assembly show in FIG. 5.

The apparatus, generally indicated as 8 in the accompanying FIGS., is used to kill unwanted plants in small, defined areas, such as in flower beds, patios and sidewalks. As shown in FIG. 1, the apparatus 8 is relatively small and lightweight and designed to be easily transported by a homeowner for use around the home. It is also designed to be safe to use by eliminating all valves or other structural elements which may cause pressure to build up inside the apparatus 8.

The apparatus 8 comprises a hand-held steam generating unit 9, a lightweight, rigid, elongated guide bar 55, a conical-shaped weed cover 60 attached to the distal end 57 of a rigid, elongated guide bar 55, and a flexible hose 50 disposed between the steam generating unit 9 and the weed cover 60. During use, the weed cover 60 is disposed around an undesirable plant 90 and steam 92 is selectively produced by the steam generating unit 9 and delivered to the weed cover 60. The weed cover 60 is specifically designed to direct and concentrate the steam 92 onto and around the plant 90. In one embodiment, the steam 92 is heated to approximately 212° F. In another embodiment, the steam 92 is super-heated to approximately 475° F.

Referring now to the FIGS. 2–5, the steam generating unit 9 includes a closed, rigid outer container 10 with two or three vertically aligned interior chambers 11–13. The upper chamber 11 serves as a water reservoir tank 20 designed to hold approximately 2 liters of water 91. Attached to one side of the tank 20 is a vertically aligned window 28 which enables the user to determine the amount of water therein. Located below the upper chamber 11 is a middle chamber 12 with an electrically powered steam generator 30 located therein. In the first embodiment, a lower chamber 13 is formed below the middle chamber 12 which contains an electrically powered super-steam generator 40. The outer container 10 is made of aluminum and measures approximately ten inches in height, eight inches in length, and five inches in width. Disposed around the perimeter of the middle and lower chambers 12, 13, respectively of the outer container 24 is a layer of foam insulation 14.

Formed on the upper surface of the outer container 10 is an upward extending handle 15 with an electrically operated pump switch 16 mounted thereon for easily activation and deactivation by the user's digits. The pump switch 16 is electrically connected to a pump 22 located inside the upper extending member of the handle 15. The inlet port of the pump 22 is connected to a suction line 23 which extends downward into the water reservoir tank 20 and terminates near the bottom surface thereof. The outlet port of the pump 22 is connected to a vertically aligned delivery tube 24 which delivers water 91 from the water reservoir tank 20 to the steam generator 30. A spray nozzle 25 is attached to the distal end of the delivery tube 24 so that water is uniformly sprayed in all directions from a substantially central location in the middle chamber to wet the contact plate 32 on the steam generator 30.

The steam generator 30 is used to quickly heat the water 91 delivered via the delivery tube 24 to produce steam 92. In the embodiment shown, the steam generator 30 comprises a flat, electrical resistant, contact plate 32 disposed transversely inside the middle chamber. Located directly below the plate 32 are heating elements 33 which draw approximately 1500 watts maximum. Also attached to the plate 32 is a temperature sensor 34 which measures the temperature of the plate 32 and deactivates the plate's electric circuit when the plate's temperature exceeds 450°. Located between the middle and lower chamber 12, 13, respectively, is a vertical steam conduit 36 designed to carry steam 92 from the middle chamber 12 to the lower chamber 13. The conduit 36 is approximately ½ inch in diameter and has sufficient length so that its upper opening is located above the stream of water from the nozzle 25 and its lower opening terminates inside the lower chamber 13.

In the first embodiment, a super-steam generator 40 is disposed inside the lower chamber 13 and used to super-heat the steam 92 produced by the steam generator 30. The super-steam generator 40 includes a flat, conduct plate 42 with heating elements 43 extended thereunder. Disposed above the conduct plate 42 are a plurality of vertically aligned baffles 44 designed to super-heat the steam 92 to approximately 475° F.

Attached to the side of the outer container 10 and adjacent to the lower chamber 13 is flexible hose 50 approximately ¼" to ½" in diameter and approximately 48" in length. The proximal end 52 of the flexible hose 50 is connected to a rigid fitting 75 extending through the side of the outer container 10 while the opposite distal end 53 of the flexible hose 50 is connected to the weed cover 60.

In the embodiment shown herein, the weed cover 60 is conical-shaped, approximately 8–12" in height and 8–12" in width. It should be understood, however, that the weed cover 60 may be cubical or cylindrical in shape. A wide, lower opening 61 is formed on the weed cover 60 which enables the weed cover 60 to be closely placed around an undesired plant 90. Formed along the lower edge 62 of the weed cover 60 are a plurality of exhaust openings 63 which allow cool air to escape from the weed cover 60 when the weed cover 60 is placed closely on the ground and steam 92 is delivered to the weed cover 60.

An elongated, rigid guide bar 55 extends diagonally upward from the weed cover 60. In the preferred embodiment, the guide bar 55 is made of aluminum or plastic tubing material, ¼" to ¾" in diameter and measuring approximately 32" in length. A handle 58 is formed on the proximal end of the guide bar 55 thereby enabling the user to easily place the weed cover 60 over an undesired plant while standing upright.

Figure 7:
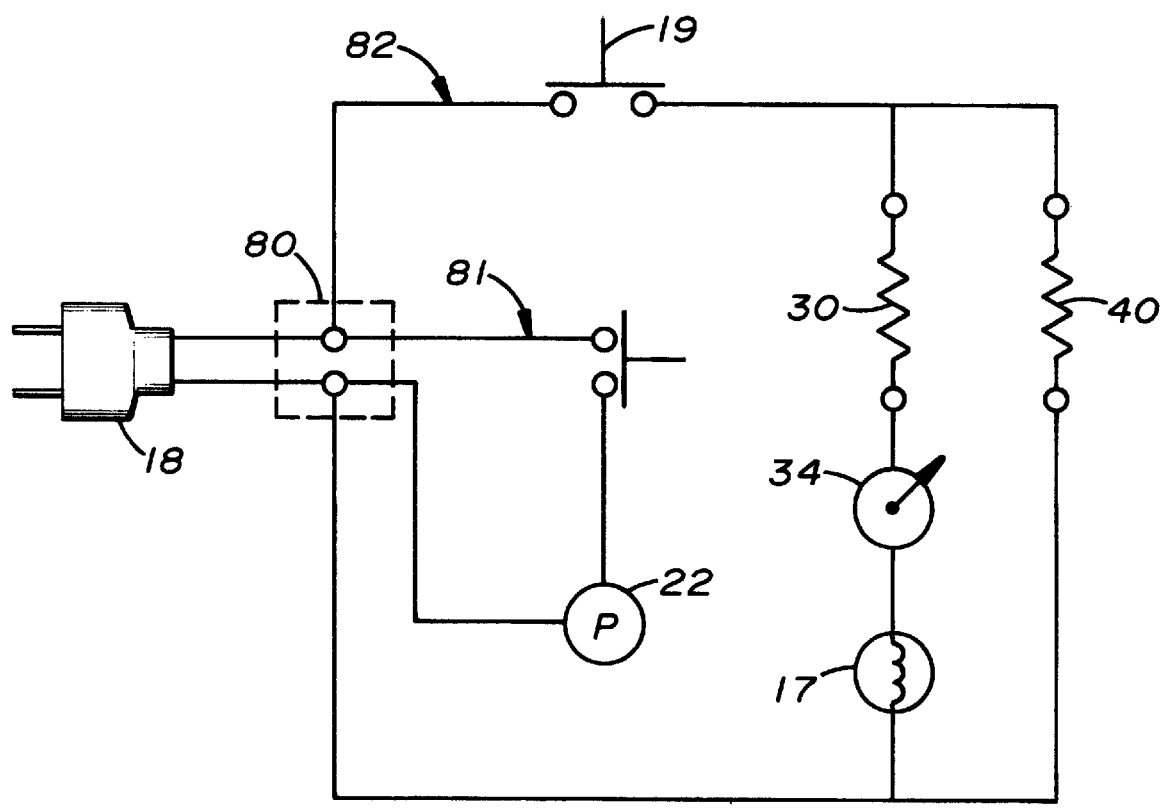
FIG. 7 is an electrical schematic of the steam generating unit.

Electrical power is delivered to the steam generating unit 9 via a long power cord 18. The power cord 18 delivers electric current to a junction box 80 located just inside the outer container 10 which divides the current into a pump circuit 81 and a steam generating circuit 83, as shown in FIG. 7. The pump circuit 81 includes the pump switch 16 which selectively controls the operation of the pump 22. The pump switch 16 is a single throw switch which activates the pump 22 through one pumping cycle. When the pump switch 16 is released, the pump 22 immediately stops pumping.

The steam generating circuit 83 includes a main heater switch 19 that activates and deactivates the steam generator 30 and the super-steam generator 40. The circuit 83 also includes the temperature sensor 34 which is electrically connected to a light 17 located on the handle 15 which informs the user that the heating plates 32 is heated to a sufficient temperature to create steam.

During use, the water reservoir tank 20 is filled with water 91. The plug on the power cord 18 is then connected to a 120 volt electrical outlet. The heater switch 19 is then activated to heat the heating plate 32. When the heating plate 32 is sufficiently heated, the light 17 is activated informing the user that the apparatus is ready to be used.

Next, the weed cover 60 is placed around an undesired plant with the lower edge placed against the soil or walkway. Water from the water reservoir tank 20 is pumped, via the pump 22 to the spray nozzle 25. The spray nozzle 25 then sprays the water 91 over the steam generator's contact plate 32. When the water 91 contacts the contact plate 32, the water immediately flashes into saturated, low (0.5 p.s.i.) pressure steam 92. The steam 92 is then directed by pressure deferential through the steam conduit 36 and into the super-steam generator 40. The super-heated steam 93 then flows through the flexible hose 50 to the weed cover 60. Steam 92 is then delivered to the weed cover 60 for one to eight seconds depending on the size and type of plant. The weed cover 60 is then lifted to observe the plant. If the plant is sufficiently wilted, the apparatus is removed to another undesired plant and the process repeated. If the plant is not sufficiently wilted, the weed cover 60 is again placed over the plant and additional super-heated steam 93 is applied.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A steam plant killing apparatus, comprising:
    a. a steam generating unit including a water reservoir, an electric steam generating means, and a pumping means used to pump water from said water reservoir to said electric steam generating means;
    b. a pump switch connected to said pumping means capable of activating said pumping means through one pumping cycle to deliver a specific volume of water to said electric steam generating means;

c. a switch means connected to said electric steam generating means enabling a user to selectively control the activation and deactivation of said electric steam generating means;

d. a weed cover capable of being placed over a plant to be killed, said weed cover have an outer shape designed to concentrate steam delivered thereto around a plant enclosed therein and;

e. a rigid conduit disposed between said electric steam generating means and said weed cover, said conduit capable of delivering steam to said weed cover.

2. The steam plant killing apparatus, as recited in claim 1, wherein said weed cover includes a plurality of exhaust openings enabling air to escape from said weed cover when steam is delivered to said weed cover.

3. The steam plant killing apparatus, as recited in claim 1, further including means to superheat steam produced by said electric steam generating means.

4. The steam plant killing apparatus, as recited in claim 1, further including an indicator means to indicate when said steam generator is sufficiently hot to produce steam when water is delivered thereto.

5. The steam plant killing apparatus, as recited in claim 1, wherein said pumping means includes a pump with a suction line that extends to said water reservior tank and a delivery tube that extends to said steam generating unit.

* * * * *